(12) United States Patent
Zaveri et al.

(10) Patent No.: US 8,132,379 B2
(45) Date of Patent: Mar. 13, 2012

(54) CEILING PANEL WITH ENHANCED ACOUSTICS AND TEXTURE

(75) Inventors: Mitul D. Zaveri, Norristown, PA (US);
James Matthew Benti, Plymouth, WI (US)

(73) Assignee: Certainteed Ceilings Corporation, Valley Forge, PA (US)

( * ) Notice: Subject to any disclaimer, the term of this patent is extended or adjusted under 35 U.S.C. 154(b) by 14 days.

(21) Appl. No.: 12/786,617

(22) Filed: May 25, 2010

(65) Prior Publication Data

US 2011/0005147 A1  Jan. 13, 2011

Related U.S. Application Data

(60) Provisional application No. 61/223,779, filed on Jul. 8, 2009.

(51) Int. Cl.
*E04F 13/00* (2006.01)

(52) U.S. Cl. .......................................... 52/311.1; 52/144

(58) Field of Classification Search ................. 52/311.1, 52/316, 144, 145; 181/290, 293, 292
See application file for complete search history.

(56) References Cited

U.S. PATENT DOCUMENTS

| | | | | |
|---|---|---|---|---|
| 2,077,155 A * | 4/1937 | Prudden | ........................ | 112/428 |
| 3,357,516 A * | 12/1967 | Cadotte et al. | ................. | 181/290 |
| 3,726,056 A * | 4/1973 | Harris et al. | ................. | 52/483.1 |
| 4,428,454 A * | 1/1984 | Capaul et al. | ................. | 181/290 |
| 4,760,677 A * | 8/1988 | Nassof | ......................... | 52/506.1 |
| 5,545,441 A | 8/1996 | Land | | |
| 5,681,408 A * | 10/1997 | Pate et al. | ........................ | 156/71 |
| 6,108,994 A * | 8/2000 | Bodine | ......................... | 52/506.07 |
| 6,772,859 B2 * | 8/2004 | D'Antonio et al. | ........... | 181/293 |
| 7,189,794 B2 | 3/2007 | Maurer et al. | | |
| 7,908,813 B2 * | 3/2011 | Gulbrandsen et al. | ..... | 52/506.09 |
| 2003/0154679 A1* | 8/2003 | Swiszcz et al. | ............. | 52/506.07 |
| 2005/0009428 A1 | 1/2005 | Porter et al. | | |
| 2008/0256879 A1 | 10/2008 | Babineau | | |

* cited by examiner

*Primary Examiner* — Brian Glessner
*Assistant Examiner* — Brian D Mattei
(74) *Attorney, Agent, or Firm* — Duane Morris LLP

(57) ABSTRACT

A ceiling tile and a method of manufacture, wherein the ceiling tile has contrasting colors of texturized woven yarn and a coating, respectively, wherein individual colors of the yarn and coating are at different depths of surface texture, wherein color contrasts accentuate the surface texture depths to be viewed, and provide a desirable, unpredictable randomness of pattern of the color contrasts.

12 Claims, 3 Drawing Sheets

CEILING PANEL WITH ENHANCED ACOUSTICS AND TEXTURE

CROSS REFERENCE TO RELATED APPLICATION

This application claims the benefit of U.S. Provisional Patent Application No. 61/223,779, Filed Jul. 8, 2009.

FIELD OF THE INVENTION

The invention relates to a ceiling tile having a desired sound absorption and surface texture.

BACKGROUND

U.S. Pat. No. 6,108,994 discloses an interior ceiling structure typically includes a system of sound absorbing and heat insulating ceiling tiles or panels installed on a metal grid. The grid is suspended below a structural ceiling of a room to create a plenum, or air space, between the rear sides of the tiles and the ceiling. The front sides of the tiles are viewed from below as a dropped ceiling of the room. Ceiling panels with desirable acoustic characteristics have a core of light weight material for sound absorption and structural rigidity, layered on front and rear sides by material coatings or coverings, all of which provide sound-absorbing properties. Another desirable attribute of ceiling tiles is to provide a consistent surface finish and appearance.

U.S. Pat. No. 5,545,441 discloses a fabric for ceiling tiles having a fabric layer of textured glass woven yarn with a white pigmented resin, and a flame resistant polymeric fluorocarbon face coating applied to a first side of said fabric layer; and a flame resistant opaque acrylic resin applied to a second side of said fabric layer.

Typically, a front side of the ceiling tile is laminated to a fiber glass cloth in which glass fibers are white in color, as produced from a white colored molten glass composition. Prior to the invention, the fiber glass cloth was constructed of a veil of nonwoven slender fibers bonded together to provide a smooth surface cloth with a random pattern of micro sized pores through the cloth. The white color fibers matched a surface paint color, which when painted with white paint provided a white smooth surface on the finished tile when viewed, especially when viewed as a dropped ceiling. The smooth surface was populated with a pattern of micro sized pores. The pores extended through the veil and extended further through the paint covering the veil, which provided a textured pattern due solely to the micro sized pores through the smooth surface on the finished tile. A drawback of the finished tile was that the smooth surface was easily discolored by attracted dust, and aging paint showed fading and discoloration over time. Further, slight warping and misalignment of different tiles were readily observable as interruptions of the otherwise smooth surface.

Prior to the invention, ceiling tiles that have a high NRC above 0.80, a light reflectance (LR) of the surface of the ceiling tile, do not have texture. They are simple 2-dimensional finishes (with a plain flat finish or a fissured appearance due to pores through the flat finish. A desired ceiling tile would have a high NRC above 0.80 with a textured finish, and preferably a textured finish accentuated with contrasting colors and individual colors at different depths of surface texture.

U.S. Pat. No. 7,189,794 discloses a cloth being made to resist formation of pills.

SUMMARY OF THE INVENTION

The present invention is a ceiling tile with a surface texture providing a combination of a high sound absorption and a rough appearance. The ceiling tile has contrasting colors and individual colors at different depths of surface texture.

An embodiment of the invention has a finish that is esthetically pleasing and has a combination of a very high sound absorption rating (i.e.) NRC of above 0.80 and a rough surface texture having contrasting colors and individual colors at different depths of surface texture.

BRIEF DESCRIPTION OF THE DRAWINGS

Embodiments of the invention will now be described by way of example with reference to the accompanying drawings.

DETAILED DESCRIPTION

Figure 1:
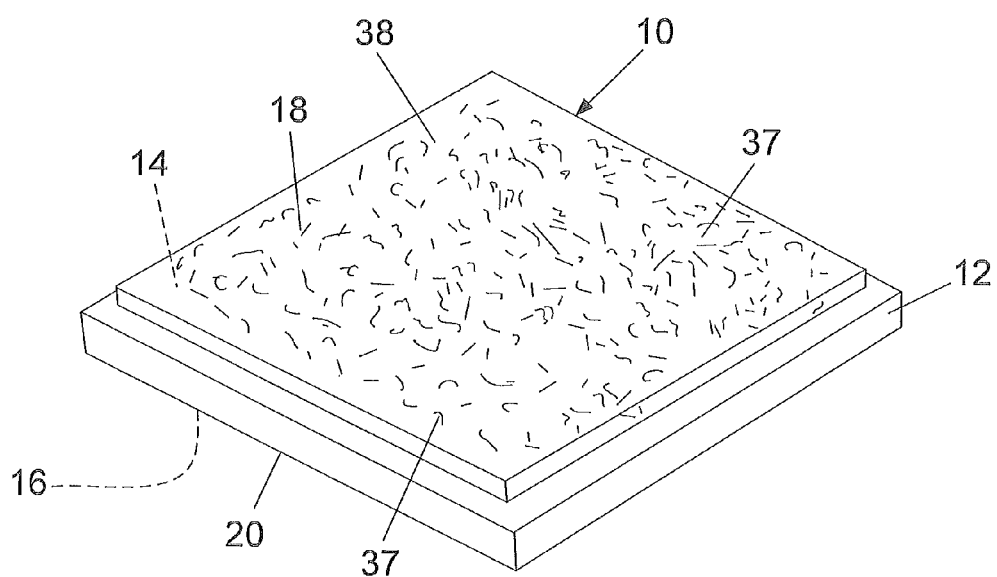
FIG. 1 is an isometric view of a ceiling tile.

In FIG. 1 each ceiling tile 10 comprises a core 12 defining a front side 14 and a rear side 16, and front and rear layers of cloth 18, 20 directly adhered to and covering the front and rear sides 14, 16, respectively. By front side 14 is meant a major surface that is exposed upon being installed to face a room to be viewed as a dropped ceiling. A rear side 16 is a major surface which faces away from the room below and can face toward a plenum defined above the installed system of ceiling tiles.

The core 12 is a structurally self-standing material structure between the front and the rear layers 18, 20. Examples of preferred core structures includes folded or pleated non-woven glass mats, porous and/or fibrous sheet materials woven or non-woven (e.g. polymer fibers and natural fibers), porous materials of resilient or rigid materials such as slag, aluminum, polymer foams, or an array or skeletal frame, of rigid or resilient elements restricting air movement or air behavior to dampen air transmitted sound.

Figure 2:
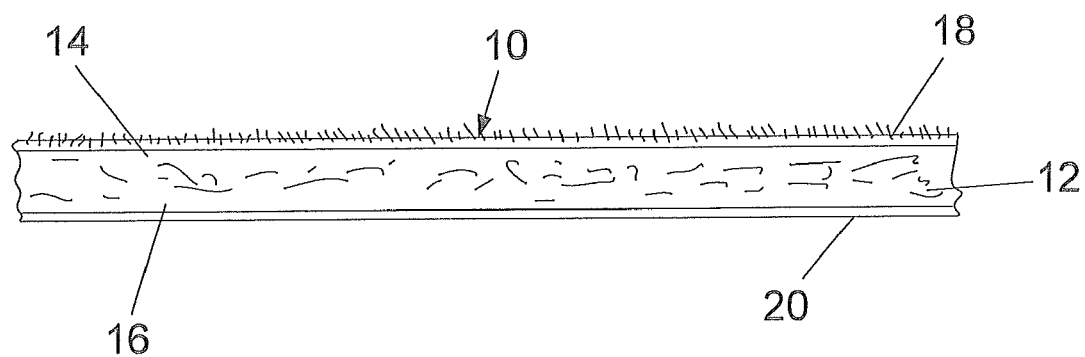
FIG. 2 is a fragmentary section of the ceiling tile disclosed by FIG. 1.

In FIG. 2, a preferred embodiment of the core 12 includes a yellow color or alternatively, a color other than yellow, fiber glass board of many layers of glass fibers. A 1 inch thick core 12 having glass fibers could be as short as ½" to as long as 4 or 5". The fibers are held by a binder which is a phenol formaldehyde based binder. The binder content is in the range of 10-15%.

A rigid, light weight insulation board provides a core of the ceiling tile. In a preferred embodiment of the core, multiple layers of randomly oriented filaments of fiber glass are accumulated and are bound together by a cured binder composition. Examples of preferred core structures includes folded or pleated non-woven glass mats, porous and/or fibrous sheet materials woven or non-woven (e.g. polymer fibers and natural fibers), open cell porous materials of resilient or rigid materials such as slag, aluminum, polymer foams, or an array or skeletal frame, of rigid or resilient elements creating an air space between the front and rear layers.

According to manufacture of the core, the filaments are formed by drawing molten glass through filament-forming orifices. The binder composition is dispersed among newly formed filaments as they fall and accumulate onto a porous belt conveyor. Alternatively, the binder composition is dispersed among the filaments after the filaments are on the conveyor. The conveyor transports binder coated filaments to a source of heat, which applies heat to the binder coated filaments to cure the dispersed binder composition.

A binder composition includes a thermosetting polymer resin dispersed or dissolved in a fluent carrier to form a water based emulsion or a solvent based solution. The binder composition can include other chemical substances, such as, a fire retardant, a fungicide or biocide, coloring matter, or other substance in a mixture with the binder. The resulting binder composition is in the form of a dry mixture, a dispersible mixture or soluble mixture. U.S. Pat. No. 7,241,487 discloses a formaldehyde free binder resin to replace a UF binder resin, a urea formaldehyde or resin, which is inherently hydrophobic especially due to a high rate of curing, The binder composition is heat cured to provide a cured resinous thermoset binder, which binds the filaments together in the rigid, light weight insulation board. For example, the binder composition is a curable urea formaldehyde resin or formaldehyde free resins being developed in the interest of reducing volatile organic compound emissions, VOC emissions.

In FIG. 2, a rear side 16 of the core 12 is laminated to a glass fiber cloth 20 using an adhesive. The cloth 20 can have fibers other than glass fibers, such as, polymer fibers. An embodiment of the cloth 20 has a construction as follows:

Technical Data Sheet
Fiber Composition—Fiber-Glass
Calculated Weight (lbs/100 sq ft) Basis Weight (lbs/100 sq ft)
Target—0.95 (46 grams/sq. m) Target—0.95
1.05 Maximum (51 gms/sq. m) 1.10 Maximum
0.80 Minimum (41 gms/sq. m) 0.80 Minimum
Resin Content
Target—16.0%
19.0% Maximum
13.0% Minimum
Tensile (lbs/3") Tensile Ratio
MD—85 Target (machine direction)
Target: 2.5
CD—34 Target 3.3 Maximum-1.7 Minimum (cross direction).

In FIG. 2, the front side 14 of the core 12 is disclosed to which a grey color, woven texturized cloth 18 is laminated using an adhesive. The adhesive used is an LAW 1913 VETAK adhesive from a supplier, Henkel Adhesive Technologies, Industrial Business, Elgin Ill., USA. The application rate for adhesive with the grey fabric is 3 g/ft$^2$-6 g/ft$^2$. For testing adherence, a 3" strip is pulled with a force gauge to test for 1.25 lbs. minimum average.

An embodiment of the ceiling tile 10 has a front side 14 of the core 12 that is laminated to a textured woven fiber glass cloth 18. The cloth 18 has the following construction,

| Warp Construction | 18 threads/inch |
|---|---|
| Fill Construction | 16 threads/inch |
| Warp Tensile, pounds min. | 70 |
| Fill Tensile, pounds min. | 50 |
| Ounces/yd A2 | 7.3 |
| LOI percent | 11.8 (loss on ignition) |

The cloth 18 is flame retardant, possesses a flame time of 2 seconds or less, and possesses a char length of less than 5.5 inches, and is flexible and can be laid flat, and has substantial dimensional stability and strength. the cloth 18 is commercially available as part number: BOF s/1963/48.3/A495 commercially available from a supplier, BGF Industries, Inc. of Porcher Industries.

Figure 3:
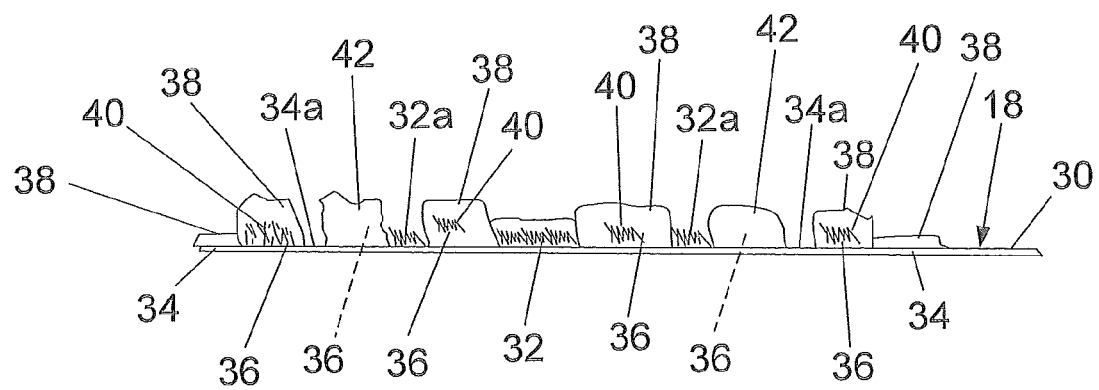
FIG. 3 is a schematic view of three depths of surface texture of the ceiling tile disclosed by FIGS. 1 and 2, further disclosing contrasting colors and individual colors at different depths of surface texture.

Further, as depicted in FIG. 3, the cloth 18 weft is constructed of fill yarns 30 of textured glass yarns 30. The fill yarns 30 have multi-filament strands that are texturized to provide bulk due to strands that are deformed outward from the axis of the yarn 30, some of which have broken ends that project outward from the yarn axis. Texturizing is produced, for example, by an air jet process disclosed by US20050009428A1, to Porter et al. to increase the bulk of the yarn 30 without increasing its mass.

In addition to increasing the bulk of a yarn 30, the glass yarns 30 are texturized to provide a speckled variegation of fibrous fluffy surface areas 32 on the yarns 30 projecting at a surface height above a speckled variegation of smoother surface areas 34 on essentially non-texturized cores of the yarns 30 at surface heights below the surface height of the fluffy surface areas 32. Further the texturized woven glass yarns 30 are texturized to provide a speckled variegation of nubs 36 or fabric pills having a small mass of fibers projecting at a surface height above that of the speckled variegation of fibrous fluffy surface areas 32. The surface texture topography of the cloth 18 has at least three visible surface depths of surface texture, wherein the projecting nubs 36 provide a first surface texture depth, the fluffy surface areas 32 provide a second surface texture depth and the smoother non-fluffed surface areas 34 on the yarns 30 provide a third surface texture depth. Different depths of surface texture topography are not limited to the three disclosed by FIG. 3. Further, the speckled variegations of the nubs 36, fluffy surface areas 32 and non-fluffy surface areas 34 densely populate the surface of the cloth 18 and are of random mixed distribution to avoid an appearance of distinctive areas or spots and to avoid a predictable visual pattern of the speckled variegations. The three depths of surface texture are set or preserved by spraying the texturized yarns with a thermoset or thermoplastic resinous binder to hold the yarn filaments in place. As an addition to the three depths of surface texture, the cloth 18 has a variegated distribution of small pores 37, FIG. 1, that are barely visible, but exist as spaces between adjacent fibers of the cloth 18 for air to penetrate through the cloth and become dispersed among the fibers of the core 12 of the ceiling tile 10 for sound dampening. A grey color of the texturized yarns 30 is provided by a grey color, molten glass composition from which the yarns 30 are made, such that the grey color permeates entirely throughout the glass yarns 30.

Then, in FIG. 3, a coating 38 of contrasting color, a white color spray coating 38 is applied to the textured woven cloth 18 using a spray gun to achieve the desired textured, rough surface texture and visual surface depth accentuated by a grey-white contrast in which the individual colors, grey and white, are located at different depths of surface texture. A splatter spray gun, a rotary motion spray gun, involves a rotary spray that sprays a consistent amount of paint, and the splatter effect or speckled effect is achieved by a combination of the rotary movement of the spray gun used, the speed of the line (for example, 40 ft/min), and the viscosity of the paint and its physical properties relevant to spray application. Further, the taller heights of the surface topography provide barriers to shield distribution of the coating 38 being sprayed by the spray gun onto other areas of the surface topography that free of the coating 38 and are visible in the grey contrasting color. The spray gun used is from supplier, ITW Industrial Finishing, 195 Internationale Blvd. Glendale Heights, Ill. 60139 and comprises a Binks® 95 with a #68 needle/nozzle combination—this with the rotary spray movement or displacement, linear production line speed of the cloth 18, and the viscosity of the coating 38 creates the splatter effect. Then the core 12 and cloth 20 and cloth 18 go through a processing step wherein the adhesive and coating 38 are oven-heated and cured and dried, respectively. Preferably, the adhesive and coating 38 are cured and dried simultaneously by passage through a drying oven.

The coating 38 includes the following paint material:

Product 9015 Cashmere "F" paint from supplier, hci products

Product Characteristics
Gloss—Flat
Weight Solids—60%±2%
Volume Solids—38%±2%
Viscosity—95-100 KU.
Spreading Rate—602 Sq. Ft~per gallon@ 1 dry mil.
Specific Gravity—1.56
Material VOC—0.02 lb./gallon
Coating VOC—0.05 lb./gallon
Dry Time at 77° F. at 50% R.H.)
To Touch—1-2 hours
To Recoat—30 min SURFACE PREPARATION: Surfaces must be dry and free from all dust, dirt, oil, or other contaminates. EQUIPMENT: This product is to apply without reduction and is water solvent for clean-up. This product is applied with conventional spray equipment, air-assisted, and HVLP equipment. Recommended settings 35 g/ft$^2$-40 g/ft$^2$. Paint coverage should be even and without streaking.

The purpose of the coating 38 is to provide a speckled paint pattern wherein the pattern is randomly speckled and has contrasting colors and contrasting surface texture depths, which accentuate the cumulative surface texture depth when viewed. The paint coating 38 substantially coats all nubs 36 to provide a white surface on the ceiling tile 10. The coating 38 on the nubs 36 further adhere and clump the yarn fibers of the nubs 36 into random distorted shapes. Further, the coating 38 has a non-penetrating viscosity to avoid penetration of the coating 38 into all surface depths of the texturized yarns 30. Such penetration of the coating 38 is avoided further by the hydrophobic property of the molten glass composition from which the glass yarns 30 are made. Further, the taller heights of the surface topography provide barriers to shield distribution of the coating 38 being sprayed by the spray gun onto other areas of the surface topography that are shielded from spray application of the coating 38 and are visible in the grey contrasting color. Thereby, side surfaces 40 of the nubs 36, FIG. 3, at least some of which, avoid the coating 38 to provide a speckled paint pattern, and to expose a contrast grey color of the texturized yarns 30, wherein contrasts of the grey color and white color accentuate the surface texture depths to be viewed. Further, the differences between coated surfaces 42 and uncoated side surfaces 40 of respective nubs 36 provide a desirable, unpredictable randomness of pattern of the grey-white color contrasts.

Further, in FIG. 3, the speckled paint pattern can be resisted by the smallest fluffy surface areas 32a that are hydrophobic and avoid capillary action of the viscous coating 38. Larger fluffy surface areas 32 do not avoid capillary action and can be coated by the coating 38. The smallest fluffy areas 32a expose a contrast grey color, while larger fluffy areas 32 are coated white in color, wherein contrasts of the grey color and white color of different fluffy areas 32 and 32a accentuate the surface texture depths to be viewed, and provide a desirable, unpredictable randomness of pattern of the grey-white color contrasts. Further, the differences between coated fluffy areas 32 and uncoated fluffy areas 32a provide unpredictable randomness to the grey-white color contrasts. The ceiling tile 10 has contrasting colors and individual colors at different depths of surface texture. Similarly, the smallest non-fluffy areas 34a expose a contrast grey color, while larger non-fluffy areas 34 are coated white in color, wherein contrasts of the grey color and white color of different fluffy areas 34 and 34a accentuate the surface texture depths to be viewed, and provide a desirable, unpredictable randomness of pattern of the grey-white color contrasts. The ceiling tile meets Class A flame spread rating when tested for ASTM E 84 (Tunnel Test) in spite of the textured surface.

The cloth 18 of a preferred embodiment of the invention provides a result of surface texture variation that is unexpected in its dimensional surface depth variation and visual accentuation of grey-white contrasts. Prior to the invention, texturized yarns were uniform in appearance to be used as a garment, such as a sweater or knit shirt or the like. Further, fabrics prior to the invention were required to be smooth to the touch and to avoid pills in the fabric surface.

The product is then transported to a tenoner, a panel edge processing equipment, wherein the product is cut by an edgebander to a specific size, typically, a 2'×2' ceiling tile 10, and each edge is cut to provide a stepped edge to fit for installation in a system grid of a dropped ceiling. The stepped edge in FIG. 1 is also known as a reveal edge. Alternatively, the edge can be configured with a square edge, and DG edge detail. The stepped edge is coated with more paint 38 to prevent unraveling at the edge, and the paint is cured and dried in an oven. The ceiling tile 10 is fully encapsulated with the fiber glass core 12 fully encapsulated on the face 14, the back 16 and on each edge.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents and patent applications referred to herein are hereby incorporated by reference in their entireties. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A ceiling tile, comprising:
   a core covered by yarn, the yarn providing a surface topography; and
   a coating of contrasting color compared to a yarn color, wherein the coating is on randomly distributed relatively taller portions of the surface topography, while some of the relatively taller portions have some of their side surfaces uncovered by the coating to expose the yarn color, and the coating is on randomly distributed relatively large fluffy surface areas of the yarn at relatively lower depths of the surface topography, while randomly distributed relatively small fluffy surface areas of the yarn are uncoated by the coating to expose the yarn color, and relatively small smoother areas of the yarn at relatively lower depths of the surface topography are randomly distributed and are uncoated by the coating to expose the yarn color, which provides a random distribution of the yarn color at different depths and a random distribution of the contrasting color at different depths.

2. The ceiling tile of claim 1 comprising: a sound absorption rating NRC of above 0.80.

3. The ceiling tile of claim 1 wherein the core is provided with stepped edges.

4. The ceiling tile of claim 1 wherein the light reflectance (LR) of the surface of the panel is above 0.80.

5. The ceiling tile of claim 1 wherein the ceiling tile has a stepped edge or a square edge.

6. The ceiling tile of claim 1 wherein the ceiling tile meets Class A flame spread rating when tested for ASTM 84 (Tunnel Test).

7. The ceiling tile of claim 1 wherein the yarn comprises a cloth constructed of fill yarns of texturized yarn.

8. The ceiling tile of claim 1 wherein the relatively taller portions, the fluffy portions and the relatively smooth surface portions of the yarn are at different surface depths of the surface topography.

9. The ceiling tile of claim 1 wherein relatively large smoother areas of the yarn at relatively lower depths of the surface topography are coated by the coating.

10. The ceiling tile of claim 1 wherein the coating is of non-penetrating viscosity to avoid penetration of the coating into all surface depths of the surface topography.

11. The ceiling tile of claim 1 wherein the yarn is hydrophobic to the coating to avoid penetration of the coating into all surface depths of the surface topography.

12. The ceiling tile of claim 1, further comprising: a cloth comprising the yarn; and a distribution of small pores in the cloth for air to penetrate for sound dampening.

* * * * *